United States Patent [19]

Murphy et al.

[11] 4,072,248

[45] Feb. 7, 1978

[54] METERING APPARATUS

[75] Inventors: John E. Murphy, Oradell; Chester Wolf, Bergenfield, both of N.J.

[73] Assignee: Lever Brothers Company, New York, N.Y.

[21] Appl. No.: 657,435

[22] Filed: Feb. 12, 1976

Related U.S. Application Data

[63] Continuation of Ser. No. 522,791, Nov. 11, 1974, abandoned.

[51] Int. Cl.² .................................................. A01J 21/00
[52] U.S. Cl. .................................. 222/56; 137/614.13; 222/135; 425/132
[58] Field of Search ......................... 99/452, 455, 459; 251/123, 124; 137/613, 614.13, 614.14; 222/452, 451, 56, 426, 135; 425/245 R, 132, 448, 447

[56] References Cited

U.S. PATENT DOCUMENTS

| 945,796 | 11/1910 | Nicholas et al. | 222/452 X |
| 1,911,166 | 5/1933 | Schwepcke | 137/613 X |
| 2,313,060 | 3/1943 | Friedman | 425/132 |
| 3,005,617 | 10/1961 | Wolfensperger | 251/124 |
| 3,615,241 | 10/1971 | Low | 222/135 X |

Primary Examiner—Robert B. Reeves
Assistant Examiner—John P. Shannon
Attorney, Agent, or Firm—Kenneth F. Dusyn; James J. Farrell; Melvin H. Kurtz

[57] ABSTRACT

The present invention is concerned with the provision of an apparatus for the metering of a viscous fluid, and more particularly to a metering device for controlling the advance of margarine feedstock into a crystallization chamber for molding into print forms by employing a first and second positive open and closure valve mechanism correspondingly operated by independent drive mechanisms.

5 Claims, 3 Drawing Figures

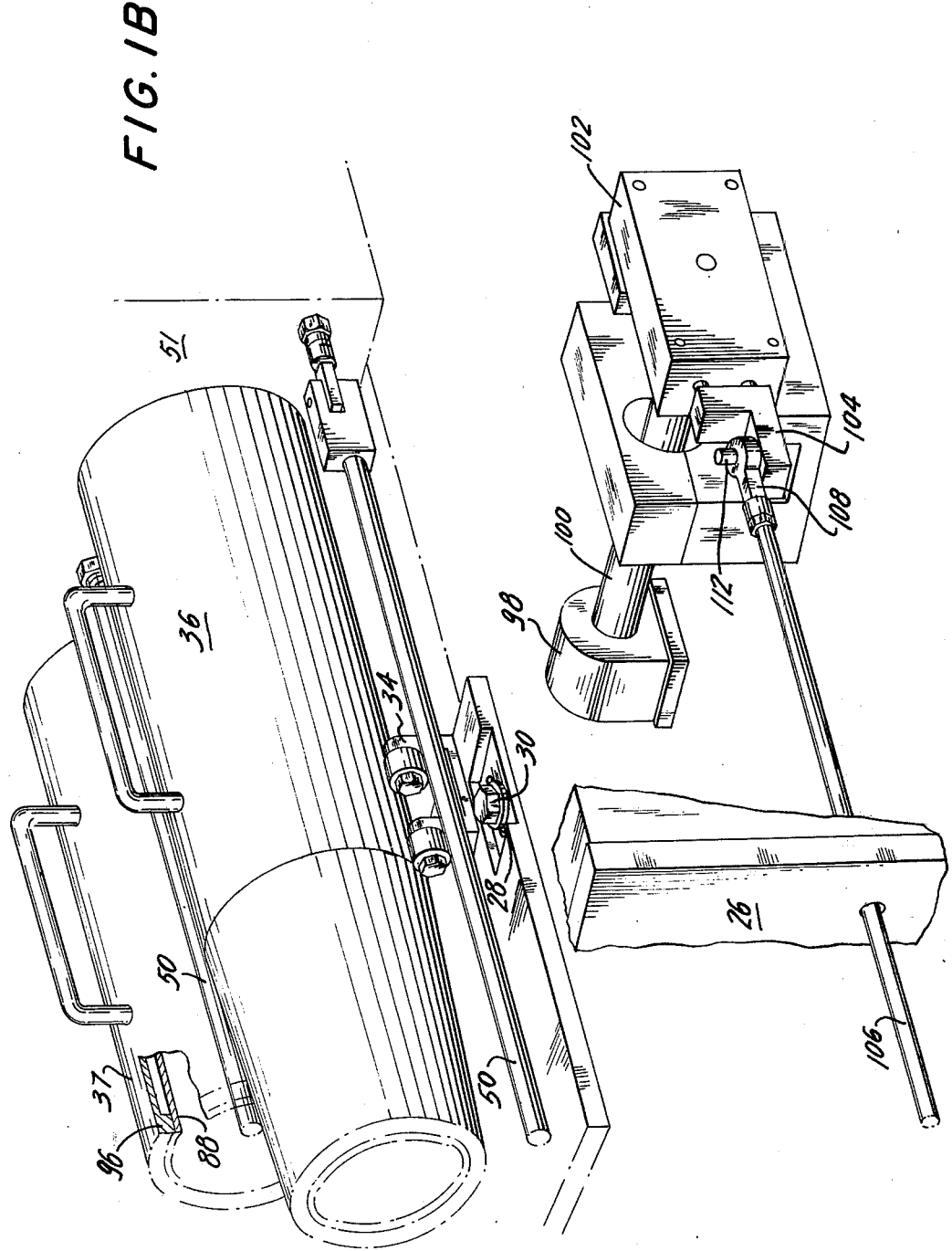

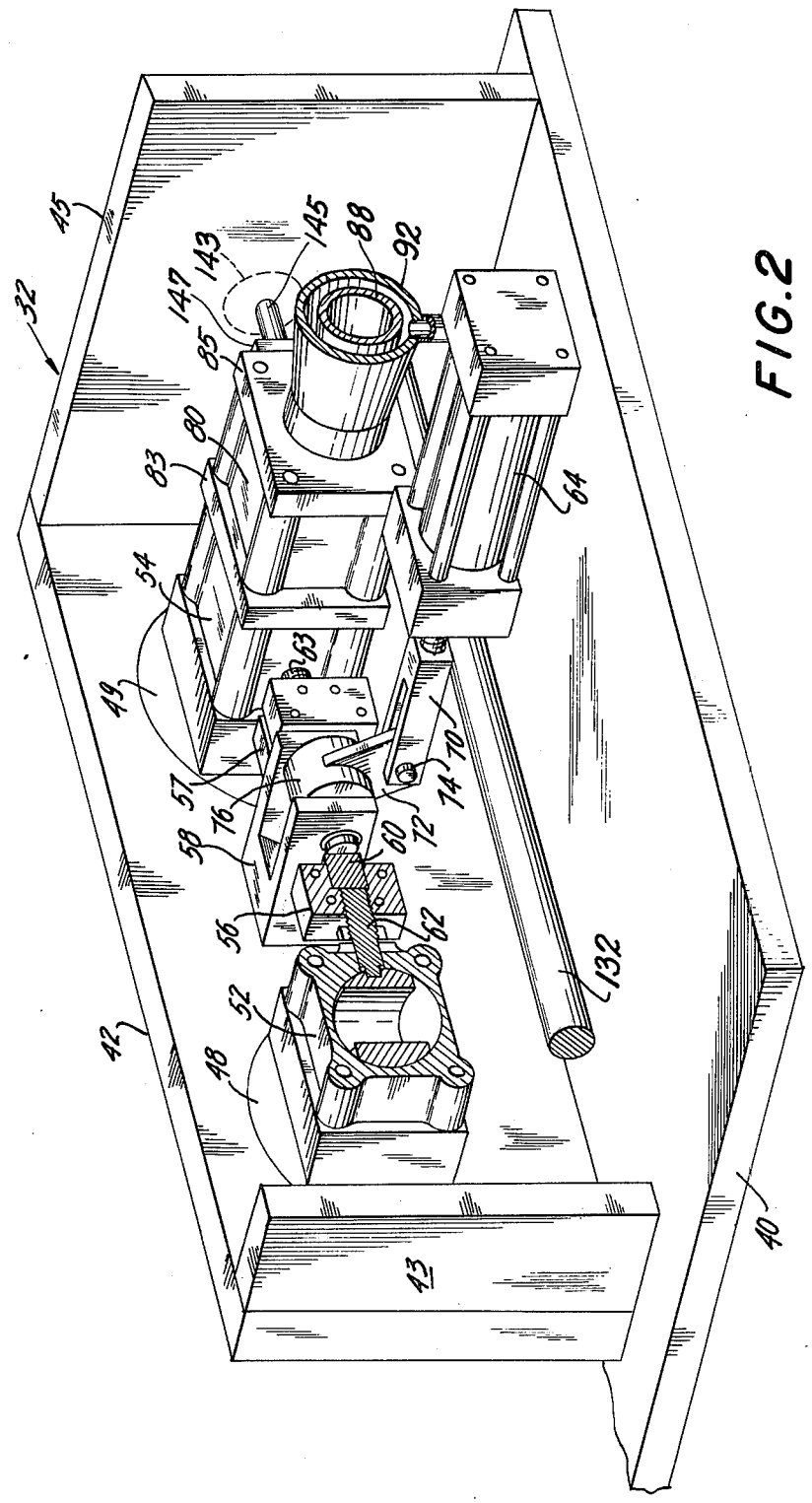

4,072,248

METERING APPARATUS

This is a continuation of application Ser. No. 522,791, filed Nov. 11, 1974, now abandoned.

BACKGROUND OF THE INVENTION

Printed forms of margarine are generally made by an extrusion process wherein margarine, supercooled fluid form, is fed into a temperature controlled chamber under pressure for subsequent crystallization. Once crystallization or a "hardening" of the margarine has taken place, it can then be molded into the desired printed forms. The term "printed forms" or "prints" is a word of art that is used to define the shape of the margarine after it has been wrapped, and generally, refers to wrapped margarine having a rectangular bar shape.

In order to process margarine into print form, liquid margarine is taken from its mixing tank and pumped at a uniform rate to a heat exchanger where it is cooled to a paste-like consistency, and then to an expansion or compensating chamber or tube. From this expansion or compensating tube, the cooled margarine, which is still in a fluid state, is forced by the feed pump pressure into a retracted piston. Through the synchronous motion of a gear arrangement, the retracted piston and its cylinder are rotated 180° and the piston is pushed forward to emit the collected margarine into a crystallization chamber. The piston is moved forward by new product being forced into the other side of the piston by means of the pressure head already established by the feed pump. The piston and cylinder are again rotated to emit the margarine into the crystallization chamber by the same process.

This step feeding process is continued until the crystallization chamber is filled with margarine. The margarine experiences a settling or crystallizing action which can be defined in terms of the time it takes a given amount of margarine to travel from the floating piston mechanism through the chamber and up to the molding or print chamber interface. It is during this time that the margarine crystallizes or solidifies and thus enables it to be molded into print forms. The crystallized margarine is forced into the mold chamber apparatus by the intermittent pressure built up in the chamber through the action of the floating piston in the step feeding process thereby causing the volume displacement of margarine into the mold.

The action of the floating piston is generally operated in synchronization with the molding operation, that is, the print mold chamber is in a receiving position to accept margarine when the piston is ejecting margarine into the crystallization chamber, hence the positive displacement of the margarine. Once the crystallized margarine is displaced into the mold, it is removed and forwarded to a synchronously operated wrapping apparatus and then onto a likewise synchronously operated packaging machine for assembling the wrapped prints into containers. This margarine processing operation is described in the brochure entitled "Lynch Morpac Model 'CT'" put out by the Lynch Corporation of Anderson, Indiana.

One of the disadvantages of the above-identified system is that the functionality of the floating piston is severely limited, not only by its fixed dimensional size, but also because each piston must be externally adjusted for precise volume displacement of margarine into the mold. Hence, the volume displaced by each of the rotary floating pistons must be adjusted precisely to the volume of the mold chambers. Otherwise, excess margarine will be forced through the mold chamber vents, thereby reducing efficiency and promoting maintenance problems due to leakage and subsequent margarine caking buildup outside of the system. Further complications exist in that sufficient margarine may not be available to fill the mold cavity thereby leading to the formation of incomplete or underweight prints.

Another disadvantage is that the 180° rotation of the piston and its ejecting movement offers a mechanically complicated and expensive system that must be continually maintained. Leakages of the liquid margarine occur through the crevices of the piston and its chamber and eventually into the crevices formed by the chamber and housing thereby causing cleaning and sanitary problems.

More importantly, however, use of the free floating piston means for metering margarine offers the distinct disadvantage of limiting the length or capacity of the crystallization chamber because of the fixed mechanical drive arrangement operating from the molding apparatus main drive. Increasingly higher pressures are required to force the margarine emulsion into the piston chamber if higher operating speeds are desired, thus limiting the efficiency of the processing operation. Variations in crystallization chamber lengths caused by product and production demands are, therefore, restricted, especially when margarines are composed of the "softer" varieties of oils which require longer chamber lengths for crystallization.

THE INVENTION

It is therefore an object of the present invention to provide an apparatus that will overcome the deficiencies of existing apparatus that meters the flow of margarine for its molding into print forms.

Another object of this invention is to provide a margarine feed system that is mechanically simple in operation and requires little or no maintenance during its operation.

More specifically, it is an object of the invention to provide a margarine metering apparatus for producing printed forms of margarine that requires relatively low and constant feed pressures and one that offers increased and varied production capacity. It is a further object to provide a metering apparatus that is adaptable to meter margarine having a wide viscosity range.

These and other objects and features of the invention will become more apparent from the following description and accompanying drawings illustrating a preferred embodiment of the invention.

FIG. 1B is a perspective view of the drive system for the margarine metering apparatus.

FIG. 2 is a perspective view of a cross-section of the metering valve system generally seen along line A—A in FIG. 1.

Figure 1A:
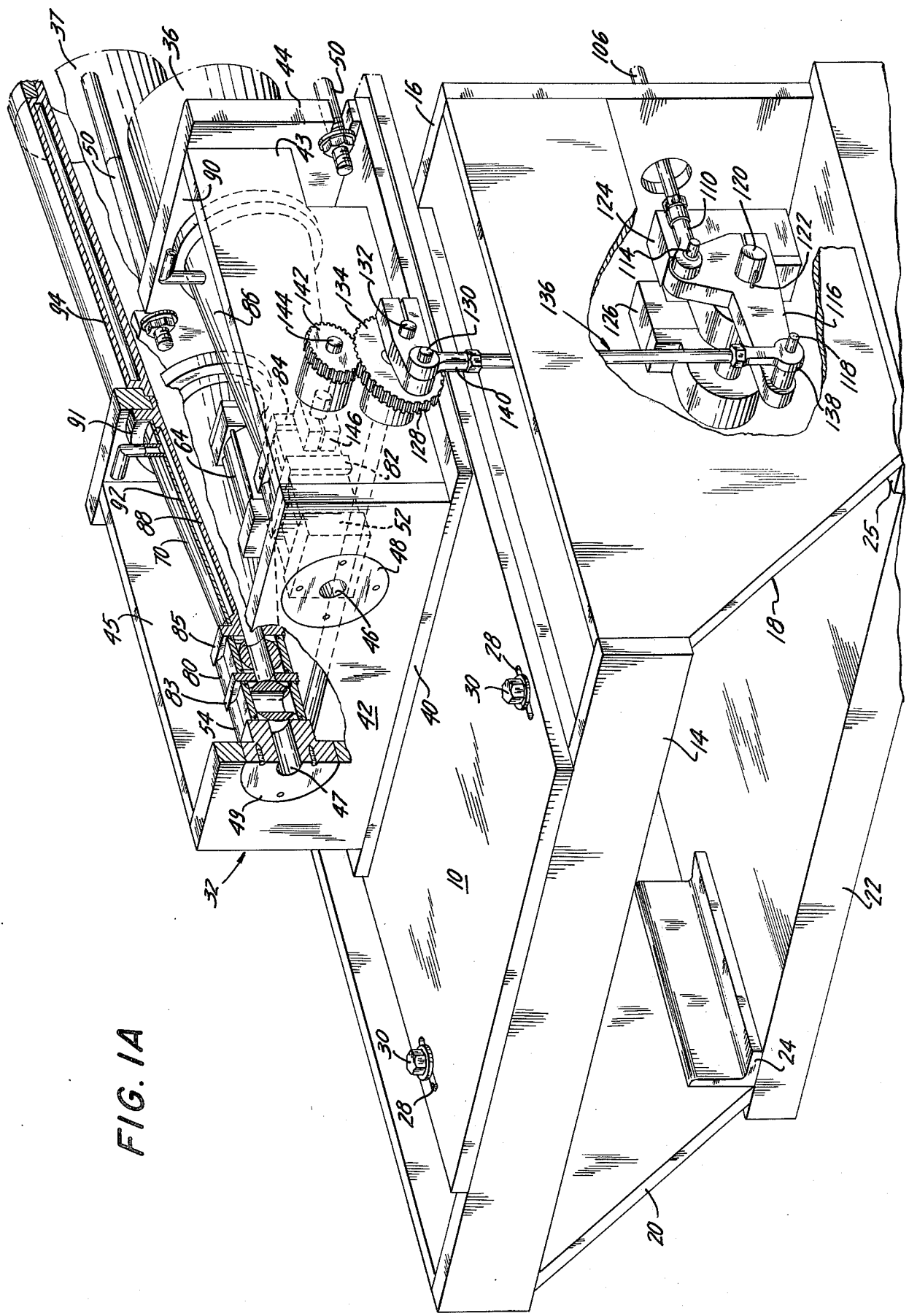
FIG. 1A is a perspective view of a margarine metering apparatus system illustrative of a preferred embodiment of the invention.

In accordance with the invention, a viscous fluid metering device is provided having first and second positive open and closure valve means communicatively mounted to each other, and separate independent drive means for operating each valve means. More specifically, the metering device includes a first drive means for operating the downstream valve means relative to the fluid flow, and a second drive means for operating the upstream valve means such that there is an unrestricted intermittent passage of fluid therethrough. The upstream valve means is operated in an "on-off" manner, that is, it is admitting fluid when the downstream valve means is in operation, and operates to a closed position when the downstream valve means is non-operative, that is, when fluid is not being metered.

The metering apparatus, while advantageous for monitoring the flow of any viscous fluid, is especially suited for the metering of margarine which requires a step feed to a crystallization or settling chamber wherein the margarine is eventually allowed to crystallize. The margarine metering apparatus preferably comprises at least one or a plurality of a set of positive open and closure valve means, desirably two sets, that are operated in parallel synchronous relationship to each other. For that matter, any number of sets of metering valves having positive opening and closure means can be utilized, provided the appropriate settling chambers and molding apparatus are incorporated into the system. A preferred valve means is a ball valve as is illustrated in FIGS. 1 and 2, and which will be described hereinafter. The invention, however, need not be limited to the use of the ball valves, but can include any valve that possesses a positive opening and closure operation.

When dual sets of metering valves are employed, each of the downstream metering valves can be operated synchronously either in phase or out of phase, desirably 90° out of phase, with respect to each other depending upon the molding apparatus demands.

In accordance with the invention, the first drive means, which manipulates the step-feed action of the downstream valve means, operates independently of the pump pressure supplied to the margarine feed. Since the desirable crystallization chamber volume is directly proportional to the machine running speeds of the downstream situated molding and wrapping apparatus, the utilization of this type of metering system offers the distinct advantage of versatility in chamber capacity by being free from the restrictions of high pressures heretofore needed to pump the viscous fluid through the floating piston type metering mechanism. Additionally, a mechanically uncomplicated metering system is provided having increased and efficiency afforded by reduced maintenance, problems and reduced fluid pump pressures. As a result thereof, margarines having a wide viscosity range that require varying lengths of settling chambers for their crystallization prior to molding, may be processed with the improved metering apparatus that may be described as follows:

Referring to FIG. 1A, a supporting metal stand 12 is provided having parallel end members 14 and 16 rigidly affixed to a pair of side supporting members 18 and 20, said members being rigidly mounted to a platform 22 with the aid of a pair of 90° braces 24 and 25.

Overlying the top of supporting stand 12 is a rectangular metal platform 10 having elongated parallel slots 28 for the insertion therethrough of mounting bolts 30 to secure platform 10 to supporting stand 12 and molding apparatus frame 26 (partially shown). Platform 10 is provided to support a housing 32 containing the metering mechanism according to the invention, and a mounting bracket 34 for the support of settling chamber 36. It will be noted at this point that the inclusion of settling chamber 37 is the result of a preferred embodiment of the invention which will be described hereinafter. Platform 10 will likewise support a mounting bracket (not shown) similar to mounting bracket 34 for the support of settling chamber 37.

Housing 32 consists of four wall sections 42, 43, 44 and 45, respectively, rigidly affixed to each other and to a base 40 to form an enclosure for the metering mechanism according to the invention. Wall 42 defines a plane through which the fluid or liquid margarine is fed to the metering mechanism, said wall having two circular openings therethrough for the insertion of a pair of snug fitting sleeves 48 and 49. containing circular openings 46 and 47, respectively, for the entry and passage of fluid or margarine therethrough from a feed source (not shown). Sleeves 48 and 49 are structured such that the downstream end relative to the direction of flow of fluid or margarine is of a generally square shape.

Wall 44 comprises two circular openings (not shown) that are larger than and concentric with openings 46 and 47 in wall 42, and are provided for the exit of fluid from housing 32. Open ended slots are provided on the lower sides and top middle portion of wall 44 to receive fastening rods 50 for securing settling chambers 36 and 37 into place between wall 44 and the molding apparatus interface 51.

Mounted to the downstream end of sleeves 48 and 49 by means of a threaded bolt arrangement are ball valves 52 and 54 which can best be seen in FIGS. 2. A metal U-shaped bracket 58 is positioned between valves 52 and 54 and securely fixed to the side of wall 42, said bracket 58 having circular openings through its extended members for receiving a turning rod 60 therethrough. Both ends of the turning rod extend outwardly from said bracket in a horizontal direction parallel to the plane of wall 42 and into fixed engagement with metal clamps 56 and 57, respectively. Ball valves 52 and 54 are provided as the upstream means which are securely coupled into threaded engagement with clamps 56 and 57, respectively, by means of threaded bolts 62 and 63 such that both of the enclosed balls of said valves can be turned simultaneously.

In order to operate valves 52 and 54, a pneumatic cylinder 64 is fixedly positioned to the base 40. A forked member 70 is provided, which is operably engaged with one end of pneumatic cylinder 64 and the lower end of a drive link 72 by means of a bolt 74. The drive link 72 is rigidly secured to a cowling 76 that is in operation engagement with turning rod 60. The pneumatic cylinder may be operated by any means known in the art, desirably by a compressed air means.

Referring now to FIGS. 1A and FIG. 2, a second pair of ball, or metering valves, 78 and 80 is provided as the downstream valve means, said valves being securely mounted to the downstream end of valves 52 and 54, respectively, by means of a threaded bolt arrangement coupled with a pair of adapter plates 82 and 83 that are positioned between valves 52 and 78 and valves 54 and 80, respectively. These adapter plates have circular openings therethrough (not shown) equal in size to the openings of the ball portion of said valves for the unrestricted flow of fluid.

In order to accommodate the flow of metered fluid from the consecutive pairs of ball valves to the respective settling chambers 36 and 37, a pair of expansion tubes 86 and 88 having the general shape of a frustum and having inlet flanges 84 and 85 and exit flanges 90 and 91, respectively, are mountably positioned and fastened to the downstream end of metering valves 78 and 80, and wall 44, by means of a threaded bolt arrangement (not shown). Gaskets (not shown) are desirably inserted between the walls, valves and expansion tubes to insure that no leakage of fluid will occur between the interfaces thereof. In addition, expansion tubes 86 and 88 are water jacketed by means of annular spacing formed by the engagement of a concentric hollow cylinder with said expansion tubes as illustrated in FIG. 2 by reference numeral 92. A constant temperature of the metered fluid is thereby maintained to minimize "channeling" of the product. A similar water jacketing arrangement is provided for settling chambers 36 and 37 as indicated by reference numerals 94 and 96 shown in FIG. 1.

Turning now to a description of a preferred embodiment of a drive means for the operation of metering valves 78 and 80, a motor 98 is illustrated in FIG. 1B which is coupled with and drives the molding and wrapping apparatus (not shown) for the formation of the margarine product into print forms. A rotary drive shaft 100 is positively engaged with drive motor 98 and an enclosed cam mechanism assembly 102, said cam mechanism being designed to have a fixed closed-dwell-open dwell relationship. This type of cam mechanism, which is well known in the art, is operatively linked to a lug containing coupling 104 for translating the rotary motion of said drive shaft initiated by motor 98 to a reciprocating horizontal motion.

As will be seen in FIG. 1A a crank arm 116 having laterally extending lugs 114 and 118 is pivotally affixed to pin 120 by means of fastener key 122, said pin 120 being pivotally and rotatably mounted within a pair of housing brackets 124 and 126 containing bearings (not shown) to allow free rotational movement of pin 120 and hence crank arm 116. Positioned and attached to between coupling 104 and crank arm 116 is a horizontally displaced metal rod 106 having eye members 108 and 110 threadedly fixed to the ends thereof for the engagement of said eye members with said coupling and crank arm by means of lugs 112 and 114.

A second crank arm 128 having a laterally extending lug 130 is pivotally and securely affixed to metal shaft 132 extending through wall 43 of metering housing 32. The shaft 132 is laterally disposed within housing 32 and extends through walls 43 and 45 in a plane parallel to wall 42 and mounted in said housing in a manner to be freely rotated by any mechanical means known to the art. Securely mounted to the same shaft and designed to be rotated therewith is a metal gear 134 juxtaposed and intermediate said crank arm 128 and wall 43. A like gear 135 is attached to the opposite end of shaft 132 in a similar manner and is positioned adjacently to the outside of wall 45 (see FIG. 2).

Crank arms 116 and 128 are operatively linked to each other by means of a vertically displaced metal rod 136 having eye members threadedly mounted on both ends thereof which are adapted to be placed and freely moved about 118 and 130, respectively.

A second gear 142, rotatably mounted and affixed to a second shaft 144, is provided and disposed such that said second gear is operably engaged and meshed with gear 134. A similar arrangement is provided on the opposite side of metering housing 32 as will be seen in FIG. 2, wherein a second gear 143 is likewise rotatably mounted and affixed to a second shaft 145 which is positioned to be operably engaged and meshed with gear 135.

Both shafts 144 and 145 extend through walls 43 and 45, respectively, of metering housing 32 in a plane perpendicular to metering valves 78 and 80, respectively, said shafts being operably engaged with adapter blocks 146 and 147, respectively, for the resultant rotation of said valves.

Having described a preferred embodiment of the invention, the operation thereof is now set forth in detail, it being understood that the scope of the invention is not to be limited to the preferred embodiment or its operation.

Margarine, or any viscous fluid that requires a step feed for subsequent mechanical treatment, is pumped to feed openings 46 and 47 by means of a positive displacement pump (not shown). The margarine at this step is in an emulsive form having been cooled to an optimum temperature for crystallization following its preparation in a mixing tank.

Once the margarine reaches the feed openings of metering housing 32, the molding machinery, which is located downstream and interfaced with the exits of settling chambers 36 and 37, is set into operation by means of motor 98 that serves as a power source for operating both the molding units and metering valves 78 and 80. It is understood that up to this point in time no product has been molded since valves 52 and 54 were pre-set to an "off" position, thereby preventing fluid from entering metering valves 78 and 80, and into said settling chambers.

The simultaneous operation of said metering valves with the molding apparatus is accomplished by the action of the main rotary drive shaft 100 of motor 98 which is converted to a horizontal reciprocating linear motion in a set closed-dwell-open-dwell relationship by means of a cam mechanism (not shown) which is well known in the art. The cam mechanism is enclosed in housing 102 as illustrated in FIG. 1B. The reciprocating horizontal motion is transmitted to crank arm 116 by means of a coupling member 104 and rod 106. The resulting pivotal action of crank arm 116 about a fulcrum defined by pin 120 causes crank arm 128 to be pivotally and partially rotated by means of the vertical reciprocating motion of rod 136. The partial reciprocative rotation of crank arm 128 causes gears 134 and 135 to move in like manner by virtue of both elements being securely attached to shaft 132. Gears 142 and 143 then perform in opposite reciprocating manner to gears 134 and 135, respectively, because of their operative engagement with each other. As a result thereof, valves 78 and 80 are mechanically opened and closed to the flow of margarine by means of the reciprocative rotative motion of shafts 144 and 145.

As soon as the molding apparatus machinery is set into motion and hence metering valves 78 and 80, valves 52 and 54 are "opened," that is partially rotated to a position to allow passage of margarine therethrough. This is accomplished by triggering the forked member 70 to a rearward position relative to the direction of fluid flow by the utilization of a compressed air means (not shown) to be operatively engaged with pneumatic cylinder 64, thereby causing the rotation of cowling 76 through drive link 72 which turns the ball sections of valves 52 and 54 90° from their closed position illustrated in FIG. 2. It is understood that the operation of valves 52 and 54 can be accomplished by any means known to a person skilled in the art, the foregoing description being a preferred embodiment for the system shown.

It is desirable for the purposes of efficiently operating the metering apparatus, to have the functional operation of valves 52 and 54 connected with the mechanical operation of the molding apparatus in a manner that when the molding apparatus is shut down or interrupted for any reason, these valves will be automatically turned to the "off" position to deny the entrance of fluid into the metering apparatus. As a practical matter, if the molding apparatus stops, the metering valves 78 and 80 may stop in a position where the valves are not completely closed to the fluid flow which would permit the free and unmetered flow of margarine into settling chambers 36 and 37. Channeling effects would be created and an even cross-sectional crystallization of margarine prevented.

The automatic actuation of valves 52 and 54 may be accomplished by connecting the existing apparatus to an electrically operated solenoid. The solenoid is utilized for triggering a compressed air means to actuate the pneumatic cylinder for actuating the valves to an "off" position when the motor 98 stops or when the operation of the molding apparatus is interrupted.

Once the settling chambers fill up with margarine the molding apparatus will become fully functional in turning out print bars of margarine. Margarine wil be step fed to expansion tubes 86 and 88 and thence into the corresponding settling chambers by the simultaneous opening and closing of metering valves 78 and 80.

Both the expansion tubes 86 and 88, and settling chambers 36 and 37 are water jacketed in order to maintain a constant temperature therein. This enhances the rate of crystallization of the margarine as well as providing an even rate of crystallization throughout the cross-section of the settling chambers.

For the purposes of the operation of the invention, the metering valves need not operate in phase or simultaneously with each other, but rather can operate out of phase, preferably 90° out of phase. For example, metering valve 80 can be set to a closed position with metering valve 78 being set 90° out of phase to admit fluid therethrough. Thus the metering valve operation can be alternate as opposed to being simultaneous. This of course will depend on whether the molding chambers at the end of each settling chamber are functioning in or out of phase with respect to each other. Thus, when one metering valve is in the open position, the corresponding mold chamber is in the receiving position. The margarine is displaced into the empty chamber by virtue of the existing pressure head caused by the positive displacement feed pump. Therefore, if the metering valves are alternate in operation, then the molding chambers must act in a corresponding alternatively operative manner. The same relationship exists if the metering valve are simultaneous, that is, the molding chambers must be simultaneous in drive operation with respect to each other. Valves 52 and 54 will still operate in the "on-off" manner as heretofore described if there is any shutdown of the molding operation.

The crystallization and molding of margarine by the dual sets of valve means described hereinbefore has the distinct advantage of permitting margarine to be metered at significantly reduced margarine feed pressures (from approximately 175 to 200 psi to about 75 to 100 psi), thereby allowing increased crystallization chamber capacity, faster molding speeds, and an overall increase in efficiency of the margarine processing system. For that matter, only one set of valves positioned in consecutive order with respect to each other are required. For example, referring to FIGS. 1A and 1B, valves 54 and 80, expansion tube 84 and settling chamber 37 need not be included in the system to process margarine for molding into print form. The linkage for driving metering valve 78 and check valve 52 would remain the same. This assumes, of course, that only one molding chamber apparatus at the exit of settling chamber 36 is present.

Overall, the invention provides a number of important advantages and can be utilized according to the needs of the manufacturer. Aside from the cost savings obtained, the metering system is mechanically uncomplicated in nature and has reduced maintenance problems.

The foregoing description has been given in detail without thought of limitation since the inventive principles involved are capable of assuming other forms without departing from the spirit of the invention or the scope of the following claims.

What is claimed is:

1. A margarine metering apparatus for use in a margarine processing machine comprising:
   a. a first and a second positive open and closed valve mechanism communicatively mounted to each other, and having an inlet communicatively mounted between said first valve mechanism and a source of margarine;
   b. an expansion tube, the interior cavity of which has the general shape of a frustum, the smaller end of said cavity being communicatively engaged with the exit of said second valve mechanism for the passage of margarine therethrough;
   c. a first drive mechanism that is operably connected to and intermittently and synchronously opens and closes said second valve mechanism to continuously meter the passage of margarine therethrough; and
   d. a second drive mechanism that is operably connected to said first valve mechanism,
   said second drive mechanism maintaining said first valve mechanism in a position to admit the passage of margarine therethrough and being capable of closing said first valve mechanism to the admission of margarine when said first drive mechanism ceases to function.

2. The margarine metering apparatus of claim 1 comprising a set of first valve mechanism, second valve mechanisms, inlets and expansion tubes, said first drive mechanism intermittently and synchronously opening and closing each of said second valve mechanisms to continuously meter the passage of margarine therethrough, and said second drive mechanism being capable of closing each of said first valve mechanisms when said first drive mechanism ceases to function.

3. The margarine metering apparatus of claim 2 wherein each of said first and second valve mechanisms is a ball valve.

4. The margarine metering apparatus of claim 3 wherein said first drive mechanism opens and closes each of said second valve mechanisms in phase with respect to each other.

5. The margarine metering apparatus of claim 3 wherein said first drive mechanism opens and closes each of said second valve mechanisms out of phase with respect to each other.

* * * * *